Figure 1:
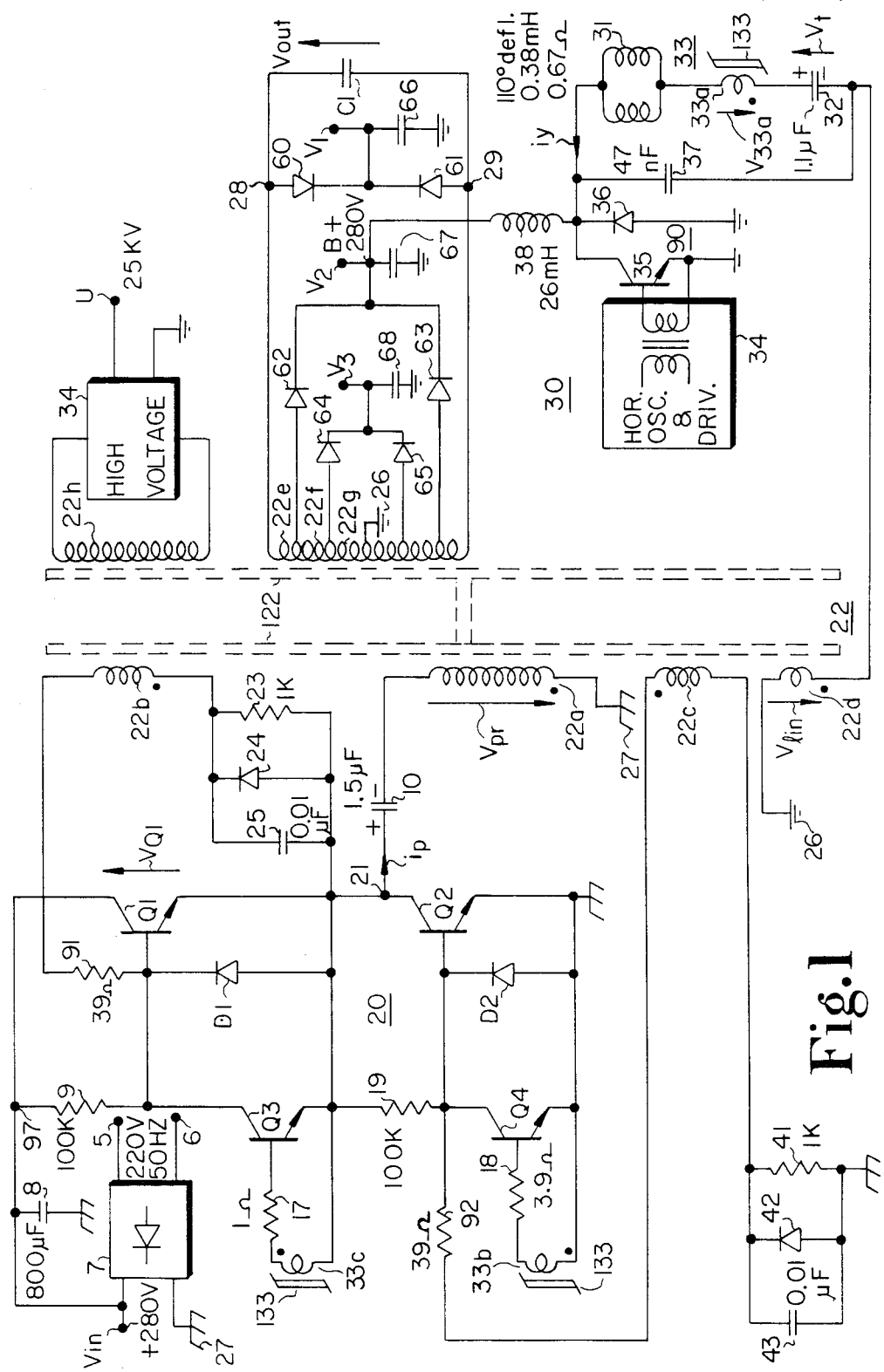

United States Patent [19]

Wedam et al.

[11] Patent Number: 4,503,367
[45] Date of Patent: Mar. 5, 1985

[54] DEFLECTION CIRCUIT WITH LINEARITY CORRECTION

[75] Inventors: Werner F. Wedam, Lawrenceville; William E. Babcock, Warren, both of N.J.

[73] Assignee: RCA Corporation, New York, N.Y.

[21] Appl. No.: 360,751

[22] Filed: Mar. 22, 1982

[51] Int. Cl.³ .................... H01J 29/56; H01J 29/70
[52] U.S. Cl. ................................ 315/371; 315/387
[58] Field of Search .................... 315/371, 408, 387

[56] References Cited

U.S. PATENT DOCUMENTS

| | | | |
|---|---|---|---|
| 3,967,182 | 6/1976 | Scott | 321/18 |
| 4,176,303 | 11/1979 | Babcock et al. | 315/400 |
| 4,176,304 | 11/1979 | Scott | 315/411 |
| 4,181,874 | 1/1980 | Babcock | 315/370 |
| 4,227,123 | 10/1980 | Dietz | 315/408 |
| 4,321,511 | 3/1982 | Willis | 315/387 |
| 4,441,058 | 4/1984 | Luz | 315/371 |

Primary Examiner—Theodore M. Blum
Assistant Examiner—Gregory C. Issing
Attorney, Agent, or Firm—Eugene M. Whitacre; Paul J. Rasmussen; Joseph J. Laks

[57] ABSTRACT

An inverter operated at the horizontal deflection frequency is coupled to a source of direct voltage for developing an alternating voltage at an output terminal of the inverter. A capacitor AC couples the alternating voltage to the primary winding of a power transformer for developing alternating polarity supply voltages across secondary windings of the transformer. A horizontal generator generates scanning current in a deflection winding. A third winding of the transformer applies to the deflection winding the alternating polarity voltage developed across the third winding. The control circuit of the inverter is responsive to a deflection rate voltage synchronized with scanning current generation for synchronizing operation of the inverter so as to enable the third winding to provide substantial linearity correction to the scanning current. The value of the coupling capacitor is chosen to produce a change in the waveshape of the inverter alternating voltage as it is coupled to the primary winding so as to enhance the linearity correction being provided by the transformer third winding.

7 Claims, 2 Drawing Figures

DEFLECTION CIRCUIT WITH LINEARITY CORRECTION

This invention relates to an inverter power supply for a television display system that provides linearity correction to the scanning current.

Several sources of raster distortion may exist in a horizontal deflection generator system using reactive scanning. Asymmetrical linearity distortion may be present due to dissipative losses occurring during scan, principally in the distributed resistance of the yoke and in the trace switch. For horizontal raster lines that are scanned from left to right during the trace interval, asymmetrical linearity distortion results in a compression of the right half of the raster relative to the left half.

Symmetrical raster distortion of geometrical origin, known as S-distortion, may be present due to the deflection center of the electron beam not being coincident with the center of the radius of curvature of the screen of the picture tube. Large deflection angle and flat faceplate picture tubes are subject to a relatively large S-distortion of the raster. Symmetrical, S-distortion results in an expansion of the sides of the raster relative to the center.

In the U.S. Pat. application Ser. No. 174,864, filed Aug. 4, 1980, now U.S. Pat. No. 4,321,511, by D. H. Willis, entitled "LINEARITY CORRECTED DEFLECTION CIRCUIT", and in the U.S. Pat. application Ser. No. 304,162, filed Sept. 21, 1981, now U.S. Pat. No. 4,441,058 by D. W. Luz, entitled "DEFLECTION CIRCUIT WITH LINEARITY CORRECTION", both herein incorporated by reference, a linearity correction circuit is described that may be used in conjuction with a horizontal deflection synchronized inverter power supply for a television receiver. An inverter applies a square-wave voltage to the primary winding of a power transformer for developing alternating polarity supply voltages across secondary windings of the transformer. A third winding of the transformer, magnetically tightly coupled to the primary winding, is coupled in series with the horizontal deflection winding and with the trace capacitor across the trace switch. When the trace switch is conducting during the horizontal trace internal, the voltage applied across the horizontal deflection winding is the algebraic sum of the trace voltage developed across the trace capacitor and the square-wave alternating polarity voltage developed across the third winding of the power transformer.

By synchronizing inverter operation so that the zero-crossover instants of the square-wave voltage occur near the corresponding zero-crossover instants of the horizontal scanning current, a substantial degree of correction for asymmetrical linearity distortion is provided.

By proper selection of the value of the trace capacitor relative to the inductance value of the deflection winding, S-shaping of the horizontal scanning current may be produced. However, especially for large angle deflection systems, suchas 110° deflection systems, a certain amount of uncorrected symmetrical S-distortion still remains because the S-shaping capacitor voltage waveform is not precisely that which is required to produce complete correction.

Figure 2:
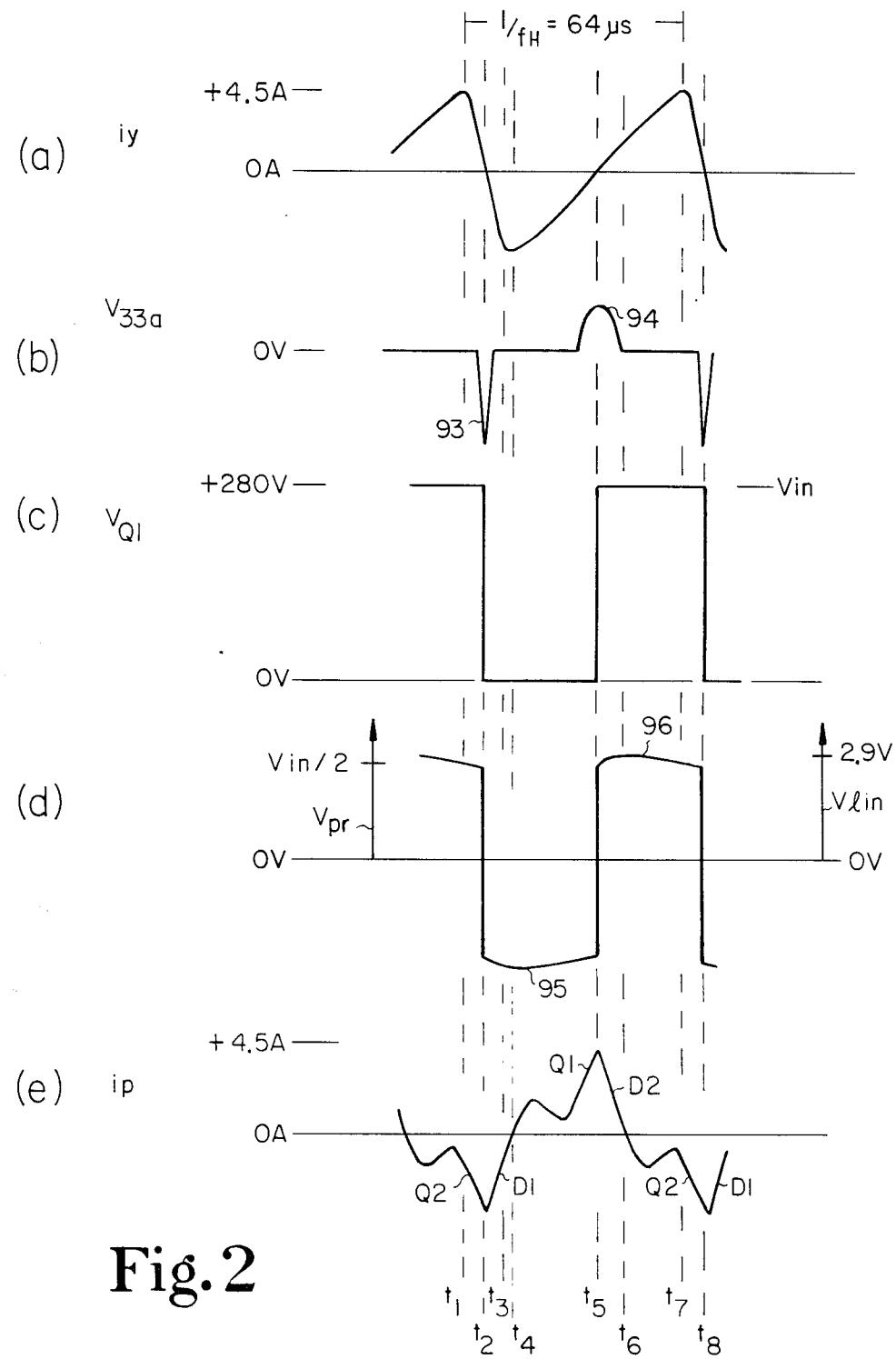

A feature of the invention is to AC-couple the output of the inverter to the primary winding of a transformer by way of a capacitor so as to produce rounding of the otherwise flat-topped alternating voltage applied to the primary winding of the power transformer. The rounded waveshape to the primary winding voltage, and thus to the linearity correction winding voltage, is such as to provide enhancement of the linearity correction already being provided. FIG. 1 illustrates an inverter driven power supply for a horizontal deflection circuit that provides linearity correction to the scanning current in accordance with the invention; and FIG. 2 illustrates waveform associated with the operation of the circuit of FIG. 1.

In the Drawing figures, the direction of a current arrow is the direction of conventional current, and the direction of a voltage arrow between terminals is such that the negative terminal is considered the reference terminal, nearest which the tail of the arrow is located.

In the power supply and horizontal deflection circuit of a television reciever, illustrated in FIG. 1, an alternating polarity mains input voltage of illustratively 220 volts AC, 50 Hz, is applied between input terminals 5 and 6 of a rectifier 7. Rectifier 7 produces an unregulated direct voltage Vin between a terminal 97 and a nonisolated current return or earth ground terminal 27. The direct input voltage Vin is filtered by a capacitor 8 and applied to the collector of a switching transistor Q1. Transistor Q1 and a switching transistor Q2 have their main collector-to-emitter current paths coupled to one another in a series arrangement between the input voltage terminal 97 and earth ground 27.

Transistors Q1 and Q2 form the output stage of a push-pull inverter 20, operation of which produces a substantially 50% duty cycle square-wave voltage at an output terminal 21 of inverter 20. The alternating output voltage produced by inverter 20 is AC coupled by way of a capacitor 10 to the primary winding 22a of a power transformer 22 to develop alternating polarity supply voltages across secondary windings 22e–22h. Secondary windings 22e–22g have a common center tap chassis ground connection 26, conductively isolated from earth ground 27. The alternating polarity supply voltages developed across secondary windings 22e–22g are full-wave recitified by respective pairs of diodes 60–65 and filtered by respective ones of capacitors 66–68 to produce respective direct supply voltages V1–V3 that energize various television receiver load circuits.

The voltage V2 serves as a B+ scan supply voltage for a horizontal deflection generator 30 that produces horizontal scanning current $i_y$ in a horizontal deflection winding 31. Horizontal deflection generator 30 is coupled to the B+ terminal through an inductor 38 and comprises a horizontal oscillator and driver circuit 34, a horizontal trace switch 90, a retrace capacitor 37, and an S-shaping or trace capacitor 32 coupled to horizontal deflection winding 31.

Secondary winding 22h, magnetically tightly coupled to windings 22e–22g, serves as a step-up high voltage winding that is coupled to a high voltage rectifier arrangement 34 that produces at an ultor terminal U an ultor voltage for the picture tube, not illustrated, of the television receiver.

To regulate the output supply voltage Vout developed between terminals 28 and 29, the end terminals of winding 22c, and to regulate all the other supply voltages developed across the other secondary windings 22f–22h, transformer 22 comprises a ferroresonant or a self-regulating saturating core transformer that includes a resonating capacitor C1 coupled between terminals 28 and 29. Such a transformer is described in the U.S. patent application of Babcock et al., Ser. No. 250,130, filed Apr. 2, 1981, now U.S. Pat. No. 4,390,819, entitled "TELEVISION RECEIVER FERRORESONANT POWER SUPPLY USING A TWO-MATERIAL MAGNETIZABLE CORE ARRANGEMENT", or in the U.S. patent application of F. S. Wendt, Ser. No. 348,902, filed Feb. 16, 1982, now U.S. Pat. No. 4,471,271, entitled "SELF-REGULATING SATURATING CORE TELEVISION RECEIVER POWER SUPPLY", both applications herein incorporated by reference.

The control circuit of inverter 20 produces alternate conduction of output switches Q1 and Q2 to provide a push-pull operation of the inverter with the primary winding 22a of power transformer 22. In the steady-state, operation of inverter 20 is synchronized with horizontal scanning current generation by means of a synchronizing pulse transformer 33, having a primary winding 33a coupled to horizontal deflection winding 31 and secondary windings 33b and 33c respectively coupled to control transistors Q3 and Q4.

Consider synchronized operation of inverter 20 during a horizontal deflection cycle $t_1$–$t_7$ of the waveforms of FIG. 2. At an illustrative instant just prior to the end of the horizontal trace interval $t_3$–$t_7$, that is, just prior to instant $t_7$, inverter switching transistor Q1 is in cutoff and inverter switching transistor Q2 is in saturated conduction. With transistor Q2 conducting, the voltage $V_{Q1}$, between the collector and emitter terminals of the other transistor, transistor Q1, equals in magnitude input voltage Vin, as illustrated in FIG. 2c. With transistor Q2 conducting, capacitor 10 is coupled across primary winding 22a of transformer 22. At a 50% duty cycle switching of inverter 20, the average value of the voltage across capacitor 10 equals $V_{in}/2$, with the left plate of capacitor 10 being positive relative to the right plate.

The current $i_p$ in primary winding 22a is illustrated in FIG. 2e. Just prior to time $t_7$, primary winding current $i_p$ is a negative current that flows as a forward collector current in transistor Q2 and that produces a discharge of capacitor 10. The discharge of capacitor 10 is evidenced in FIG. 2d by the decrease in magnitude of primary winding voltage $V_{pr}$ between time $t_6$, the instant at which primary winding current $i_p$ becomes negative, and time $t_8$, the instant at which switching transistor Q2 becomes cut off.

During the interval $t_5$–$t_8$, forward biasing voltage for transistor Q2 is developed by a feedback winding 22c tightly coupled magnetically to primary winding 22a. The path for forward base current begins, for example, at the dotted terminal of winding 22c, continues through a resistor 92, the base-emitter junction of transistor Q2, and a diode 42 to the undotted terminal of winding 22c.

At some point within the horizontal retrace interval $t_1$–$t_3$ of FIG. 2a, horizontal deflection current $i_y$ has decreased sufficiently to enable core 133 of synchronizing pulse transformer 33 to come out of magnetic saturation, thereby enabling a pulse 93, illustrated in FIG. 2b, to be induced across pulse transformer primary winding 33a. The duration of sychronizing pulse 93 encompasses the zero-crossover instant $t_2$ within retrace of horizontal deflection current $i_y$. This synchronizing pulse is transformer coupled by way of secondary winding 33b to the base of control transistor Q4 through a resistor 18. The conduction of transistor Q4 shunts forward base current away from the base of switching transistor Q2 and enables a reverse base current to flow which produces the cutoff of transistor Q2 near time $t_2$ of FIGS. 2c and 2d.

In attempting to maintain flux continuity in core 122 of transformer 22, the voltage across primary winding 22a begins to reverse in polarity, making the undotted teminal of primary winding 22a positive relative to the dotted terminal. Damper diode D1 and the diode formed by the base-collector junction of transistor Q1 become forward biased. The negative primary winding current $i_p$ flows as a reverse collector current in transistor Q1 after time $t_2$.

After time $t_2$, the undotted terminal of feedback winding 22b, magnetically tightly coupled to primary winding 22a, becomes positive relative to the dotted terminal. With the undotted terminal of feedback winding 22b positive, a forward base current flows in inverter switching transistor Q1, the forward base current path beginning, for example, at the undotted terminal, and continuing through a resistor 91, the base-emitter junction of transistor Q1, and a diode 24, to the dotted terminal of winding 22b. Transistor Q1 is therefore ready to conduct positive primary winding current when so required.

Between times $t_2$ and $t_5$, the magnitude of the voltage applied to primary winding 22a equals the difference between the direct input voltage Vin and the voltage across capacitor 10, the capacitor voltage being referenced to the negative terminal of the capacitor. This applied voltage is such as to make the dotted terminal of primary winding 22a negative relative to the undotted terminal. With the primary winding voltage $V_{pr}$ negative beginning at time $t_2$, primary winding current $i_p$ begins to decrease in magnitude from its peak negative value at time $t_2$, as illustrated in FIG. 2e. Primary winding current $i_p$ remains negative from time $t_2$ until time $t_4$ and continues to discharge capacitor 10 during this interval as evidenced by primary winding voltage $V_{pr}$ increasing in magnitude from time $t_2$ until time $t_4$.

Between time $t_4$ and time $t_5$, the zero-crossover instant during trace of horizontal scanning current $i_y$, current $i_p$ of primary winding 22a is positive and flows as a forward collector current in transistor Q1. The positive current $i_p$ charges capacitor 10, as evidenced by the decreasing magnitude primary winding voltage $V_{pr}$ between times $t_4$ and $t_5$.

Near time $t_5$, the horizontal deflection current $i_y$ has decreased sufficiently in magnitude to again bring core 133 of pulse transformer 33 out of magnetic saturation, enabling a synchronizing pulse 94 of FIG. 2b to be developed across primary winding 33a. The duration of synchronizing pulse 94 encompasses the zero-crossover instant $t_5$ within trace of horizontal deflection current $i_y$.

Pulse 94 is transformer coupled by secondary winding 33c to the base of control transistor Q3 through a resistor 17. Control transistor Q3 becomes conductive near time $t_5$ shunt forward base current away from switching transistor Q1, thereby producing the cutoff of the switching transistor near time $t_5$. The cutoff of switching transistor Q1 produces a reversal in polarity of the voltages across primary winding 22a and feedback windings 22b and 22c to enable by regenerative action the forward biasing of damper diode D2 and the diode formed by the base-collector junction of transistor Q2.

The positive primary winding voltage $V_{pr}$ beginning at time $t_5$ forces current into capacitor 10 and produces a decrease in magnitude of the positive primary winding current $i_p$, as illustrated in FIG. 2e after time $t_5$. At time $t_6$, primary winding current $i_p$ has decreased to zero and charged capacitor 10 to its maximum voltage, as indicated by the peak of the primary winding voltage $V_{pr}$ occurring near time $t_6$. Between time $t_6$ and $t_8$, the primary winding current flows as a forward collector current in transistor Q2.

During start-up of the television receiver, feedback windings 22b and 22c provide the required regenerative feedback needed to produce free-running oscillation of inverter switching transistors Q1 and Q2. To begin the switching action of inverter 20 upon initial energization of the television receiver, a small amount of current flows from terminal 97 to the base of transistor Q1 through a relatively large valued resistor 9 to initiate the turn-on of the transistor and the application of voltage to primary winding 22a. Regenerative feedback from winding 22b then brings transistor Q1 into saturated conduction. A relatively large valued resistor 19 is coupled between the emitter of transistor Q3 and the collector of transistor Q4 to ensure the initiation of oscillation under substantially all normal conditions. Furthermore, the arrangement of resistor 41 and capacitor 43 paralleling diode 42 and the similar arrangement of resistor 23 and capacitor 25 paralleling diode 24 may also be needed to ensure proper start-up self-oscillation.

As described in the aforementioned U.S. patent application of D. H. Willis and the U.S. patent application of D. W. Luz, substantial correction of asymmetrical horizontal linearity distortion may be accomplished by coupling a winding 22d of transformer 22 of FIG. 1 in circuit with the horizontal deflection winding 31. During the horizontal trace interval, when trace switch 90 is conductive, the voltage applied between the bottom terminal of horizontal deflection winding 31 and chassis ground 26 substantially equals the algebraic sum of the trace voltage $V_t$ developed across S-shaping capacitor 32 and the voltage $V_{lin}$ developed across the linearity correction winding 22d, assuming the pulse transformer voltage $V_{33a}$ is neglected.

Linearity correction winding 22d is tightly coupled magnetically to primary winding 22a. The voltage $V_{lin}$ across winding 22d is therefore the same waveshape as the primary winding voltage $V_{pr}$ and is illustrated in FIG. 2d by the same waveform as the primary winding voltage $V_{pr}$ but using a different voltage scale shown at right of FIG. 2d.

Synchronization of the operation of inverter 20 accomplished by pulses 93 and 94 of transformer 33 is such as to synchronize the zero-crossover instants of linearity correction voltage $V_{lin}$ with the corresponding zero-crossover instants of horizontal scanning current $i_y$, as noted by inspection of the waveforms of FIGS. 2a and 2d. Much of the asymmetrical linearity distortion that results in the compression of scanned horizontal raster lines at the right side of the raster relative to the left side of the raster may be attributed to dissipative losses occurring in horizontal deflection winding 31 and trace switch 90.

With the phasing of linearity correction voltage $V_{lin}$ relative to that of horizontal deflection current $i_y$ as shown in FIGS. 2a and 2d, positive horizontal deflection current flows out of the dotted terminal of linearity correction winding 22d during trace when the dotted terminal is positive relative to the undotted terminal, and a negative horizontal deflection current flows when the dotted terminal is negative, indicative of a flow of power out of linearity correction winding 22d into horizontal deflection winding 31 throughout the trace interval. The result of this power flow is the general compensation of the effects of the dissipation referred to above, thereby providing substantial asymmetrical linearity correction to the horizontal scanning current.

Alternatively explained, asymmetrical linearity distortion is a result of the division of the voltage being applied across horizontal deflection winding 31 between the inductive portion of the winding and the distributed resistive portion. As horizontal scanning current $i_y$ of FIG. 2a increases, an increasingly smaller portion of the applied voltage is applied across the inductive portion of the winding, resulting in a shallower slope to the deflection current waveform towards the end of trace. Linearity correction winding 22d provides the required correction by applying an additional voltage to the deflection winding, phased in such a manner as to increase the total voltage applied across the horizontal deflection winding during the later part of the horizontal trace interval to compensate for the effects of the IR voltage drop.

The voltage $V_{lin}$ also compensates, to a certain extent, for the asymmetrical linearity distortion produced due to the step change in voltage that occurs at the top terminal of horizontal deflection winding 31 during switchover of conduction from damper diode 36 to horizontal output transistor 35 within trace switch 90.

The existence of symmetrical raster distortions should also be taken into account when designing raster distortion correction circuitry. Geometrical distortion of the S-distortion type, where the sides of the raster appear expanded relative to the center, may be substantially corrected by the proper selection of the value of trace capacitor 32. The value of capacitor 32 may be chosen low enough to establish the resonant frequency of capacitor 32 and deflection winding 31 at a frequency that is sufficiently lower than the horizontal deflection frequency $f_H$ to provide substantial waveshaping of the horizontal deflection current $i_y$. The waveshaping of the horizontal deflection current $i_y$ is such as to make the rate of change of the deflection current waveform near the beginning and ending portions of horizontal trace less than that near the center. The effect of this waveshaping is to oppose the geometrically induced S-distortion.

Capacitor 32 introduces sinusoidal waveshaping of the horizontal deflection current to compensate for geometrical S-distortion. The ideal waveshape of the horizontal deflection current is, however, closer to the waveshape of a hyperbolic function rather than a sinusoidal one. Thus, a certain amount of residual S-distortion remains, and the horizontal deflection current is either slightly over-corrected or under-corrected with respect to proper S-shaping.

A feature of the invention is a power supply and horizontal deflection circuit that produces enhancement of the linearity correction already being provided by linearity correction winding 22d or by trace capacitor 32. It has been observed that by using a push-pull inverter 20 where the output of the inverter is AC coupled to the primary winding 22a of power transformer 22 through a coupling capacitor, such as capacitor 10, enhancement of the existing linearity correction may be obtained by the proper choice of the capacitor value. If the value of coupling capacitor 10 is made sufficiently low, the charging and discharging of the capacitor by the primary winding current $i_p$ during each cycle of inverter operation produces a significant AC component to the voltage being developed across the coupling capacitor.

Between times $t_5-t_8$, the primary current $i_p$ of FIG. 2e is a ramp-like generally negative-going waveform. Coupling capacitor 10 integrates the current $i_p$ between times $t_5-t_6$ to round out the top portion 96 of the voltage waveform $V_{pr}$ or $V_{lin}$ of FIG. 2d, with the peak magnitude of the rounded voltage waveform occurring near time $t_6$, one of the zero-crossover instants of the current $i_p$ within a cycle of inverter operation. Similarly, between times $t_2-t_4$, the primary current $i_p$ is a ramp-like generally positive-going waveform. Capacitor 10 integrates the current to round out the negative portion 95 of the voltage waveform $V_{pr}$ or $V_{lin}$, with the peak magnitude of the rounded voltage near time $t_4$, the other zero-crossover instant of the current $i_p$.

By proper choice of the value of coupling capacitor 10, the linearity correction voltage $V_{lin}$ that is applied to horizontal deflection winding 31 is of the waveshape illustrated in FIG. 2d having rounded portions 95 and 96 instead of portions with a very flat waveshape that would otherwise have been produced had the value of coupling capacitor 10 been chosen large. The rounding of the top and bottom of linearity correction waveform $V_{lin}$ provides significant enhancement of the existing linearity correction because the voltage applied across the horizontal deflection winding and the trace switch, during horizontal trace, is similar in waveform to that illustrated in FIG. 2d, with rounding of the top and bottom of the waveform. By connecting winding 22d in the proper polarity as illustrated in FIG. 1, the rounded portions of the two waveforms will cancel substantially, resulting in a substantially improved, linear scan.

Enhancement of linearity correction in the meanner described above may be obtained even when using other types of power transformers 22. For example, power transformer 22, instead of being a ferroresonant or self-regulating type, may be a high leakage, linear transformer similar to the ones described in U.S. patent application Ser. No. 220,847, filed Dec. 29, 1980 by D. H. Willis entitled "TELEVISION RECEIVER FERRORESONANT LOAD POWER SUPPLY", and U.S. patent application Ser. No. 255,396, filed Apr. 20, 1981, now U.S. Pat. No. 4,353,014, by D. H. Willis entitled "TELEVISION RECEIVER FERRORESONANT LOAD POWER SUPPLY WITH REDUCED SATURABLE REACTOR CIRCULATING CURRENT", both herein incorporated by reference.

Other advantages accrue when using the power supply arrangement of FIG. 1 wherein a DC blocking capacitor 10 and a power transformer primary winding 22a are coupled in a series arrangement to the output terminal 21 of a push-pull inverter 20. For example, the maximum voltage stress on the collector of output transistor Q1 or Q2 when the transistor is nonconductive equals approximately the input voltage Vin, ignoring transient induced voltages. In contrast, a voltage stress of twice the input voltage Vin is impressed on a push-pull inverter arrangement driving a center tap primary winding. Further, a center tap primary winding coupled to a push-pull inverter arrangement typically requires the primary winding to be bifilarly wound. The arrangement of FIG. 1 does not require a bifilarly wound primary winding. Still further, by AC coupling the current to the primary winding 22a, synchronized operation of push-pull inverter 20 at a duty cycle other than 50% does not result in excessive current flowing in the primary winding due to asymmetrical duty cycle operation.

What is claimed is:

1. An inverter supplied television display system with deflection circuit linearity correction, comprising:
    a source of direct voltage;
    an inverter coupled to said direct voltage source for developing at an inverter output terminal a generally square-wave alternating voltage;
    a power transformer having a primary winding and a secondary winding;
    means including a capacitance for AC coupling said alternating voltage to said primary winding to develop an alternating polarity voltage across said primary winding having rounded tops that are more rounded than that of said square-wave alternating voltage;
    a deflection winding;
    a deflection generator coupled to said deflection winding for generating scanning current therein;
    a third winding of said power transformer coupled to receive scanning current and to apply to said deflection winding the alternating polarity voltage developed across said third winding, said alternating voltage across said third winding also having rounded tops that are more rounded than that of said square wave alternating voltage; and
    synchronizing means coupled to said inverter and responsive to a deflection rate voltage synchronized with scanning current generation for synchronizing inverter operation so as to enable the rounded top alternating polarity voltage across said third winding to provide substantial linearity correction to said scanning current.

2. A television display system according to claim 1 wherein said inverter includes first and second output switches coupled in a series arrangement across said direct voltage source, said output terminal comprising a junction terminal of the two switches.

3. A television display system according to claim 2 wherein said capacitance and said primary winding are coupled in a series arrangement across one of the two switches.

4. A television display system according to claim 3 including inverter control means coupled to the two switches for producing alternate conduction of the two switches to provide a push-pull operation of said inverter with said transformer primary winding.

5. A television display system according to claim 4 including at least one feedback winding of said transformer coupled to at least one of the two inverter switches to produce free-running operation of said inverter when the inverter is not in the synchronized mode of operation.

6. A television display system according to claim 5 wherein said power transformer comprises a self-regulating, saturating core traansformer for regulating the voltage developed across said secondary winding.

7. A television display system according to any one of the preceding claims including a high voltage winding of said transformer for stepping up the voltage developed across said secondary winding, an ultor terminal and a rectifier arrangement coupled to said high voltage winding for producing an ultor voltage at said ultor terminal.

* * * * *